United States Patent [19]
Cunkelman et al.

[11] Patent Number: 5,332,297
[45] Date of Patent: Jul. 26, 1994

[54] CHARGING CUT-OFF VALVE ARRANGEMENT FOR MICROPROCESSOR-BASED ELECTROPNEUMATIC LOCOMOTIVE BRAKE CONTROL SYSTEM

[75] Inventors: Brian L. Cunkelman, Wilmerding; Richard F. Balukin, Pittsburgh; George B. Neilson, Greensburg, all of Pa.

[73] Assignee: Westinghouse Air Brake Company, Wilmerding, Pa.

[21] Appl. No.: 51,963

[22] Filed: Apr. 26, 1993

[51] Int. Cl.[5] .............................................. B60T 15/14
[52] U.S. Cl. .................................... 303/15; 303/20
[58] Field of Search ............... 303/3, 8, 15, 16, 17, 303/20, DIG. 3

[56] References Cited
U.S. PATENT DOCUMENTS

| | | | |
|---|---|---|---|
| 3,583,771 | 6/1971 | Dressler, Jr. | 303/20 |
| 3,799,623 | 3/1974 | Wickham et al. | 303/20 |
| 3,901,558 | 8/1975 | Burkett | 303/20 X |
| 4,904,027 | 2/1990 | Skantar et al. | 303/DIG. 3 X |
| 5,090,780 | 2/1992 | Powell | 303/20 X |
| 5,222,788 | 6/1993 | Dimsa et al. | 303/15 |

*Primary Examiner*—Robert J. Obertleitner
*Assistant Examiner*—Lee W. Young
*Attorney, Agent, or Firm*—Gary J. Falce

[57] ABSTRACT

A microprocessor-based locomotive brake control system having an electropneumatic brake pipe pressure regulating circuit via which a train brake pipe pressure is controlled and a normally closed charging cut-off valve between the brake pipe regulating circuit and the brake pipe. The charging cut-off valve is electropneumatically controlled in order to effect opening of the normally closed charging cut-off valve on a controlling locomotive. An arrangement is provided for maintaining the charging cut-off valve open when electric power is lost on a controlling locomotive, while providing for closure of the charging cut-off valve on a non-controlling locomotive irrespective of the presence or absence of electric power.

7 Claims, 1 Drawing Sheet

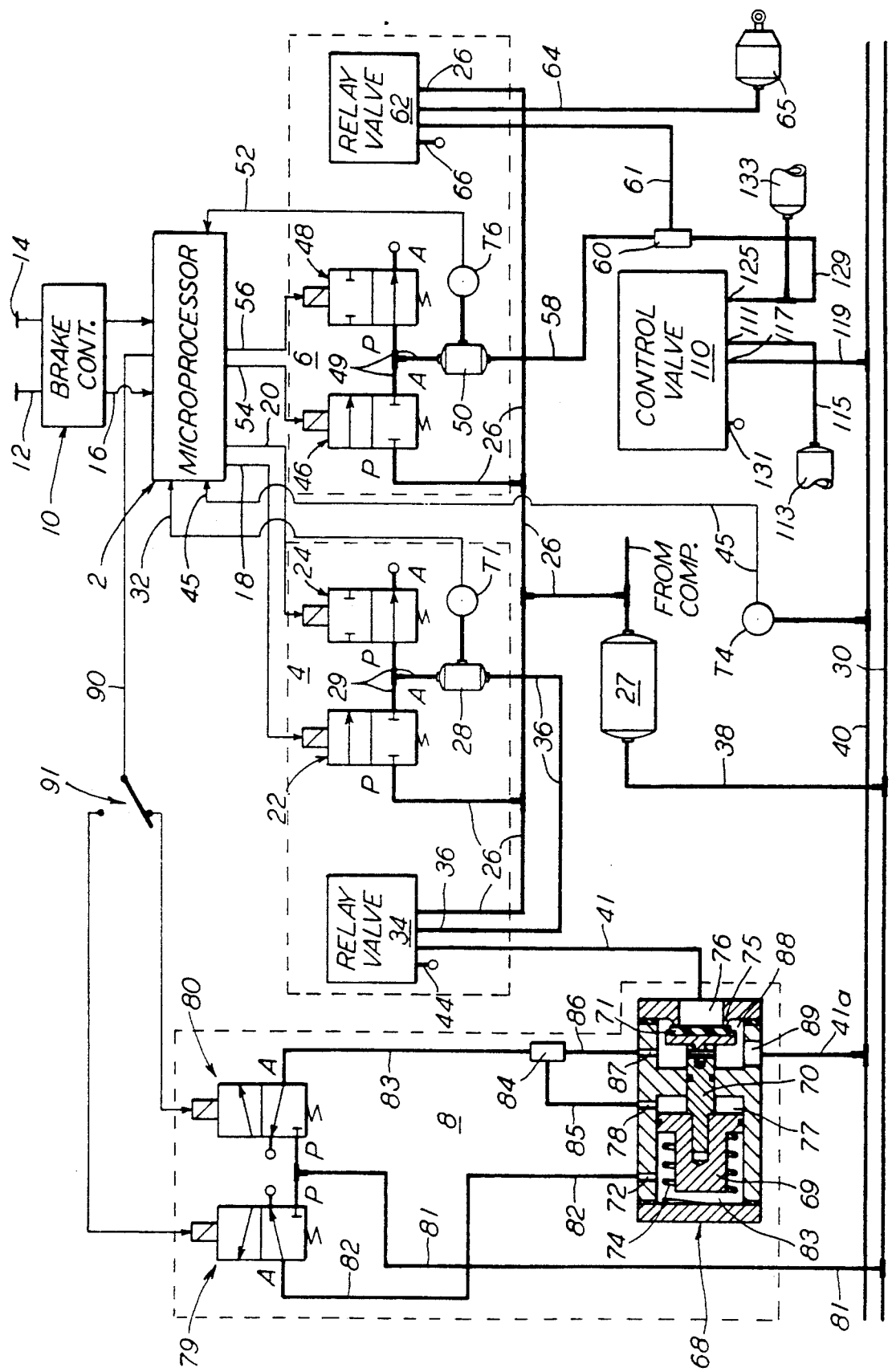

CHARGING CUT-OFF VALVE ARRANGEMENT FOR MICROPROCESSOR-BASED ELECTROPNEUMATIC LOCOMOTIVE BRAKE CONTROL SYSTEM

BACKGROUND OF THE INVENTION

The present invention relates to microprocessor-based electropneumatic type locomotive brake control systems and particularly to an improved brake pipe charging cut-off valve arrangement for such a locomotive brake control system.

Modern-day locomotive controls, including the locomotive brake control system, incorporate computer technology to reduce hardware and to facilitate adaptation of the system to various customer requirements.

In one such brake control system, described in U.S. Pat. No. 5,222,788, a cab-mounted, handle-operated, brake controller outputs a desired brake command signal to a microprocessor unit, which interprets this brake command signal in terms of a feedback signal indicative of the pressure of air in an equalizing reservoir, and then effects operation of application and release electropneumatic valves to adjust the equalizing reservoir pressure in accordance with the brake command signal.

A high-capacity pneumatic relay valve device is employed to vary the trainline brake pipe pressure in accordance with variations of the equalizing reservoir pressure, in order to control the railway car brakes. This so-called brake pipe control circuit of the aforementioned brake control system is shown and described in U.S. Pat. No. 4,904,027.

The brake control system further includes a locomotive brake cylinder control circuit having electropneumatic application and release valves. The locomotive brake cylinder control electropneumatic valves are operated by the microprocessor in response to changes in brake pipe pressure initiated by the brake pipe control circuit in accordance with movement of an automatic brake handle of the cab brake controller. Another high-capacity pneumatic relay valve device controls the pressure in the locomotive brake cylinders according to the pressure output of the locomotive brake cylinder control circuit application and release electropneumatic valves.

The electropneumatic valves in the brake pipe control circuit and in the locomotive brake cylinder control circuit are arranged to assume a pressure release state, in the event of a power loss at the microprocessor unit. In consequence of such a power loss, therefore, brake pipe pressure is reduced while, concurrently, the locomotive brake cylinder pressure is released. A pneumatic back-up control valve in the locomotive automatic brake control circuit is provided to establish locomotive brake cylinder pressure in response to the afore-mentioned reduction of brake pipe pressure resulting from such fail-safe operation of the electropneumatic valves in the brake pipe pressure control circuit, there being a double check valve to separate the pneumatic backup control valve from the electropneumatic valves in the locomotive brake cylinder control circuit.

Additional electropneumatic valves are employed in conjunction with a charging cut-off valve in a branch pipe via which the brake pipe pressure control circuit is connected to the locomotive brake pipe. The charging cut-off valve is provided to establish communication between the brake pipe pressure control circuit and the brake pipe when the locomotive is set up for "lead" operation, as a controlling locomotive, and to interrupt such communication when the locomotive is set up for "trail" operation, as a non-controlling locomotive.

The afore-mentioned charging cut-off valve is bistable and thus remains in its set position in the event of a microprocessor malfunction that causes a loss of power. In the event such a malfunction occurs on a controlling locomotive that is subsequently downgraded to non-controlling status, it will be appreciated that the charging cut-off valve remains in its previously set open position. Typically, such a non-controlling locomotive is hauled "dead", i.e., without electrical power, whereby the application and release electropneumatic valves in the brake pipe pressure control circuit are de-energized. This in turn causes the relay valve in this control circuit to assume an exhaust condition, thereby venting the brake pipe via the open charging cut-off valve. Accordingly, the ability to recharge the brake pipe from another controlling locomotive, following a "loss of power" brake application, could be jeopardized.

SUMMARY OF THE INVENTION

It is, therefore, the object of the present invention to provide a charging cut-off valve having a normally closed condition to which the valve reverts in the absence of microprocessor power, except when a locomotive is operating in a controlling mode, or when a locomotive having microprocessor power is operating in a non-controlling mode.

Briefly, there is provided in a microprocessor-based locomotive brake control system a brake pipe charging cut-off arrangement comprising, in addition to the locomotive brake pipe, a source of fluid under pressure; regulator means via which the brake pipe pressure is provided in accordance with a certain chosen control pressure; a charging cut-off valve having an open position for providing fluid pressure communication between the regulator means and brake pipe, and a closed position for interrupting fluid pressure communication therebetween; selector means for establishing the charging cut-off valve open and closed positions in accordance with a desired controlling or non-controlling mode of locomotive operation; a microprocessor for providing electric power to the regulator and selector means; a lead and trail electropneumatic valve, each having a supply port to which the fluid pressure source is connected and a delivery port communicated with said supply port in an energized condition thereof and to atmosphere in a de-energized condition thereof; and switch means for connecting electric power from the microprocessor to either one of the lead and trail electropneumatic valves, while concurrently cutting off electric power from the microprocessor to the other of the lead and trail electropneumatic valves to establish the afore-mentioned controlling and non-controlling modes of locomotive operation, the lead electropneumatic valve being energized in the controlling mode and the trail electropneumatic valve being energized in the non-controlling mode; bias means for urging the charging cut-off valve toward the closed position so that, in the absence of electric power at the regulator means and both of the lead and trail electropneumatic valves, fluid pressure communication between the brake pipe and regulator means is interrupted; and sensing means for maintaining the charging cut-off valve in its open position in opposition to the bias means in accordance with loss of electric power from the microprocessor when the locomotive is in a controlling mode.

DESCRIPTION OF THE INVENTION

Referring to the drawing, there is shown a locomotive electropneumatic brake control system having a microprocessor 2 that controls a brake pipe pressure control circuit 4, a locomotive brake cylinder control circuit 6, and a brake pipe charging cut-off control circuit 8. Microprocessor 2 receives input signals from a cab brake controller 10 having an automatic brake control handle 12 and an independent brake control handle 14.

Manual operation of automatic brake control handle 12 into the service brake zone between brake release and full service positions establishes a level of brake pipe pressure corresponding to a desired level of brake application. The handle position in the service zone is converted into a corresponding electrical brake command signal by a suitable encoder, or the like, which is fed to microprocessor 2 via line 16. Microprocessor 2 responds to this brake command signal and generates a regulated 24-volt output signal at wires 18,20 via which the solenoid operators of two-way, spring-returned, charging and release electropneumatic valves 22,24 are actuated. Charging valve 22 is normally closed and release valve 24 is normally open, the inlet P of charging valve 22 being connected by a pipe 26 to a main reservoir 27 to which air is supplied from a compressor (not shown), and the outlet A of release valve 24 being connected to atmosphere. Main reservoir 27 is connected by a pipe 38 to a main reservoir equalizing pipe 30 that is interconnected between the units of a locomotive consist. A control reservoir 28 is connected to a pipe 29 via which outlet A of charging valve 22 is connected to inlet P of release valve 24. A pressure transducer T1 monitors the pressure in control reservoir 28 and transmits a corresponding feedback signal to microprocessor 2 via wire 32.

The control port of a high capacity pneumatic relay valve 34 is connected by a pipe 36 to control reservoir 28. Relay valve 34 may be a conventional, well-known C-2 type relay valve typically employed in the 26 type locomotive brake valves and also in the 30-CW module manufactured by the Westinghouse Air Brake Company. Relay valve 34 further includes a supply port that is connected by pipe 26 to main reservoir 27, a delivery port that is connected by a pipe 41, 41a to brake pipe 40 via a charging cut-off valve 68 of charging cut-off control circuit 8, and an exhaust port 44 that is connected to atmosphere. Charging cut-off valve 68 is open on controlling locomotive units to establish communication between brake pipe 40 and relay valve 34 and closed on non-controlling units to interrupt such communication. Relay valve 34 operates in accordance with the pressure in control reservoir 28, supplying air from main reservoir 27 to pipe 41 or releasing air from brake pipe 40 via pipe 41 and exhaust port 44. The train brake pipe 40 carries compressed air to the cars in the train, the brakes of which are controlled in accordance with variations of such brake pipe pressure in a well-known manner.

The locomotive brake cylinder control circuit 6 is controlled in accordance with the brake pipe pressure, as monitored by a transducer T4, which transmits a corresponding electrical feedback signal via wire 45 to microprocessor 2. This permits the microprocessor to establish the locomotive brake cylinder pressure.

Locomotive automatic brake control circuit 6 consists of a normally closed, two-way, spring-returned, electropneumatic application valve 46, a normally open, two-way, spring-returned, electropneumatic release valve 48, a control reservoir 50 and a pressure transducer T6. Inlet P of application valve 46 is connected via pipe 26 to main reservoir 27, while outlet A of release valve 48 is connected to atmosphere. Reservoir 50 is interconnected between outlet A of application valve 46 and inlet P of release valve 48 via a pipe 49. Transducer T6 instantaneously monitors the pressure in reservoir 50 and transmits a corresponding electrical feedback signal to microprocessor 2 via wire 52. The solenoid operators of the respective application and release valves 46,48 are connected by wires, 54,56 to microprocessor 2, which is capable of supplying 24 volts to these control wires under normal operating conditions. The pressure in control reservoir 50 is regulated by these electropneumatic application and release valves in inverse relationship and at a predetermined ratio relative to brake pipe pressure changes. Reservoir 50 is connected by a pipe 58 to one inlet of a double check valve 60, the outlet of which is connected by a pipe 61 to the control port of a high capacity pneumatic relay valve 62. This relay valve 62 may be a well-known, standard J-type relay valve device manufactured by the Westinghouse Air Brake Company, further having a supply port that is connected by pipe 26 to main reservoir 27, a delivery port that is connected by a pipe 64 to the locomotive brake cylinder device 65, and an exhaust port 66 that is connected to atmosphere. Relay valve 62 provides the required high capacity to supply compressed air from main reservoir pipe 26 to brake cylinder device 65, and to release brake cylinder pressure via exhaust port 66, in accordance with the pressure level established in reservoir 50.

The locomotive brake cylinder control circuit 6 is further provided with a pneumatic back-up automatic brake control valve 110. This brake control valve 110 may be a basic MC-30C type control valve device that is well known in the railroad braking industry, being manufactured by the Westinghouse Air Brake Company, and shown and described in Operation and Maintenance brochure 4220-5, published by the Westinghouse Air Brake Company.

As shown in the drawing, brake control valve 110 includes a supply port 111 to which an auxiliary reservoir 113 is connected via a pipe 115, a control port 117 to which brake pipe 40 is connected via a pipe 119, a delivery port 125 connected to the other inlet of double check valve 60 by a pipe 129, and an exhaust port 131 that is connected to atmosphere. Connected to pipe 129 is a displacement reservoir 133 that simulates the brake cylinder volume to assure proper operation of control valve 110.

In charging cut-off control circuit 8, charging cut-off valve 68 includes a piston 69 having a stem 70 to which a poppet valve element 71 is connected. A chamber 73 having a port 72 is formed on one side of piston 69, being subject to compressed air which acts in concert with a bias spring 74 to urge piston 69 in a right-hand direction, in which poppet valve element 71 is engaged with a seat 75 that surrounds a supply port 76, thereby establishing the closed condition of cut-off valve 68.

Another chamber 77 is formed on the opposite side of piston 69, being subject to compressed air connected via a port 78 to urge piston 69 in a leftward direction in which poppet valve element 71 is disengaged from seat 75, thereby establishing the open position of cut-off valve 68.

Also included in charging cut-off control circuit 8 are solenoid operated, spring-returned, "trail" and "lead" electropneumatic valves 79 and 80, respectively, the solenoid operator of these valves being connected to microprocessor 2 via wire 90 and a two-position selector switch 91 that, in actual practice, is integrated in microprocessor 2 and establishes the "lead" or "trail" status of the locomotive. Electropneumatic valves 79 and 80 are two-position, 3-way valves having a normally closed inlet P and a normally vented outlet A, in accordance with a de-energized condition of the solenoid operator. In the energized condition, outlet A is cut off from atmosphere and connected to inlet P, the inlet P of each valve 79,80 being connected by a pipe 81 to main reservoir pipe 30. Outlet A of "trail" electromagnetic valve 79 is connected by a pipe 82 to port 72 of cut-off valve 68, and outlet A of "lead" electropneumatic valve 80 is connected by a pipe 83 to one inlet of a double check valve device 84, the outlet of which is connected by a pipe 85 to port 78 of cut-off valve 68. The other inlet of double check valve device 84 is connected by a pipe 86 and a port 87 to an interlock chamber 88 of charging cut-off valve 68 in which poppet valve 71/75 is disposed. This interlock chamber 88 is connected to brake pipe 40 via a port 89 and pipe 41a.

INITIAL CHARGING

Prior to initial charging, i.e., prior to power being supplied to microprocessor 2, the electropneumatic valves in the respective brake control circuits 4, 6, and 8 are de-energized, and accordingly assume a normal position, as shown, under the influence of their return springs. Consequently, control reservoir 28 is vented to atmosphere via outlet A of release valve 24.

When power is subsequently turned on and handle 12 on the controlling locomotive brake controller 10 is moved to release position to initiate charging, a difference exists between the brake command signal transmitted to microprocessor 2 via wire 16, in accordance with the position of handle 12 and the feedback signal transmitted from transducer T1 to microprocessor 2 via wire 32, indicative of the pressure level of control reservoir 28. The polarity of this signal difference causes microprocessor 2 to energize electromagnetic application and release valves 22, 24, of the brake pipe control circuit 4, thereby causing these valves to be shifted from their normal de-energized positions, as represented by the connections shown in the lower valve envelope, to the position represented in the upper valve envelope. Consequently, compressed air is connected from main reservoir 27 to control volume 28 via pipe 26, ports P and A of application valve 22 and pipe 29, this pressure in pipe 29 being cut off from atmosphere at port P of release valve 24.

When the pressure in control reservoir 28, as monitored by transducer T1, corresponds substantially to the brake command signal at wire 16, microprocessor 2 de-energizes application valve 22, while maintaining release valve 24 energized. This establishes a lap condition in which further supply and release of control reservoir 28 pressure is terminated, it being understood that as the control reservoir pressure approaches the command pressure, application valve 22 is controlled in accordance with the afore-mentioned U.S. Pat. No. 4,904,027, in order to prevent overshoot and consequent valve cycling.

This control reservoir pressure is in turn connected via pipe 36 to relay valve 34, which in turn supplies air from main reservoir 27 to pipe 41 and the charging cut-off valve 68.

Brake pipe charging cut-off control circuit 8 is set up to either open or close charging cut-off valve 68, depending upon the "lead" or "trail" status of the locomotive, in order to establish or interrupt the charging of brake pipe 40. On the controlling locomotive, selector switch 91 is set in "lead" position, thereby connecting microprocessor power from wire 90 to the solenoid of electropneumatic valve 80, while concurrently disconnecting microprocessor power to the solenoid of electropneumatic valve 79. In its energized condition, electropneumatic valve 80 connects inlet P to outlet A. Consequently, charging cut-off valve chamber 77 is supplied with main reservoir air via locomotive main reservoir pipe 30, pipe 81, valve 80, pipe 83, double check valve 84, and pipe 85; while chamber 73 remains vented via pipe 82 and de-energized electropneumatic valve 79. The main reservoir air pressure effective in chamber 77 develops a force on piston 69 to overcome bias spring 74 and shift piston 69 in a leftward direction in which poppet valve element 71 is disengaged from seat 75, thereby establishing the open condition of cut-off valve 68 to accommodate the charging of brake pipe 40 to a predetermined running pressure which can be adjusted at microprocessor 2, as desired.

On non-controlling locomotives, selector switch 91 is set in "trail" position and brake pipe charging cut-off control circuit 8 is accordingly set up to energize the solenoid operator of electromagnetic valve 79 and to de-energize the solenoid of electropneumatic valve 80. In its energized condition, electromagnetic valve 79 connects inlet P to outlet A. Consequently, charging cut-off valve chamber 73 is supplied with main reservoir air pressure via locomotive main reservoir pipe 30, pipe 81, the energized electropneumatic valve 79, and pipe 82. The force of this pressure acting on piston 69 combined with the force of spring 74 effects closure of valve element 71 to prevent charging of brake pipe pressure from the non-controlling locomotive.

Concurrently, de-energized electropneumatic valve 80 vents pipe 83 leading to inlet 84 of double check valve 84, which accordingly connects brake pipe pressure from pipe 41a, charging cut-off valve interlock chamber 88 and pipe 86 to pipe 85 and chamber 77, as the brake pipe is charged. The pressure in chamber 77 acts on an area of piston 69 reduced by the area of stem 70, this reduced differential piston area being compensated by the differential area of valve element 71 subject to the pressure in chamber 88 and port 76. However, since the main reservoir pressure in chamber 73 is greater than the opposing brake pipe pressure in chambers 77 and 88/76, the fluid pressure force, in addition to the force of spring 74 acting on the piston assembly, maintains closure of cut-off valve 68.

On a locomotive hauled dead in the locomotive consist, electropneumatic valves 79,80 are both de-energized, since power is unavailable on the dead locomotive. Thus, both chambers 73 and 77 of charging cut-off valve 68 are vented via the respective electropneumatic valves 79 and 80. Chamber 77, however, is supplied with brake pipe pressure via double check valve 84. Since electropneumatic valves 22,24 are de-energized, relay valve 34 is effective to vent pressure at port 76 of the charging cut-off valve 68. Being normally in a closed condition due to spring 74, valve element 71 cuts off the exhaust of brake pipe pressure via the relay valve. Moreover, the absence of pressure at port 76 acting on valve element 71 within the area delineated by valve seat 75 establishes a force differential on valve element 71 which urges piston 69 in the same direction as spring 74 to maintain closure of valve 71/75 in opposition to the brake pipe pressure in chamber 77 acting thereon. It will be appreciated that spring 74 and the pressure areas of stem 70 and valve element 71 within the area of seat 75 are chosen to assure such valve closure.

Brake pipe pressure in pipe 40 is concurrently supplied via pipe 119 and supply port 117 to control valve 110, which accordingly assumes a release position. Brake cylinder control pressure in pipe 129 and displacement reservoir 133 is thus vented via delivery port 125 and exhaust port 131.

Further, during charging of brake pipe 40, transducer T4 transmits a feedback signal to microprocessor 2 via wire 45. While the charging brake pipe pressure builds up to a value corresponding to a reference signal that is stored in microprocessor 2 representing the desired running or charge pressure of the train, application and release valves 46,48 of locomotive automatic brake control circuit 6 remain de-energized, as shown. In this de-energized condition, application valve 46 interrupts the supply of main reservoir air to control reservoir 50 by disconnecting its inlet and outlet ports P, A, and release valve 48 connects control reservoir 50 to atmosphere via pipe 47 and its connected inlet and outlet ports P, A.

It will be appreciated from the foregoing that control pipe 61 of relay valve 62 is vented via double check valve 60 and either pipe 58 leading to the vented control reservoir 50 or pipe 129 leading to control valve 110. Brake cylinder 65 is accordingly vented via exhaust port 66 to maintain the locomotive brakes released during this charging of the brake pipe.

AUTOMATIC APPLICATION OF CAR BRAKES

Following charging of brake pipe 40, a brake application may be initiated on the cars of the train by movement of automatic handle 12 out of release position into the service application zone on the lead or controlling locomotive. The handle position is encoded and fed to microprocessor 2 via wire 16. The difference between the electrical brake command signal at wire 16 and the electrical feedback signal at wire 32 causes microprocessor 2 to de-energize wire 20 while also maintaining wire 18 de-energized. Application valve 22 thus continues to interrupt the supply of main reservoir pressure at inlet P thereof, while release valve 24 transitions to the position shown, in which its inlet P is connected to outlet A. The pressure in control reservoir 28 is thus released to atmosphere via pipe 29 and release valve 24 until the signals at wires 16 and 32 substantially correspond. When this occurs, microprocessor 2 causes wire 18 to remain de-energized, while energizing wire 20. Consequently, both the application valve 22 and the release valve 24 assume a closed or lap state in which no further change in control reservoir pressure occurs.

The resultant reduction of control reservoir pressure is reflected at the control port of relay valve 34, which, in turn, operates to vent brake pipe 40 via branch pipe 41a, the open charging cut-off valve 68 at the lead or controlling locomotive unit, pipe 41 and exhaust port 44 of relay valve 34. Pressure in the trainline brake pipe 40 is thus reduced in accordance with the pressure reduction of control reservoir 28 to cause a brake application on the cars of the train in accordance with the selected position of brake controller automatic handle 12 in the service brake zone.

AUTOMATIC APPLICATION OF LOCOMOTIVE BRAKE

Concurrently, an electrical feedback signal is transmitted to microprocessor 2 at both the controlling and non-controlling locomotives via transducer T4 and wire 45 corresponding to the instantaneous pressure in brake pipe 40. Since this brake pipe feedback signal at wire 45 is less than the reference signal at microprocessor 2, the locomotive automatic brake control circuit 6 is activated to effect energization of application valve 46 and release valve 48 via wires 54 and 56. Application valve 46 is shifted to its open position, in which inlet P is connected to outlet A, while release valve 48 is shifted to its closed position, in which outlet A is cut off from inlet P. Main reservoir pressure is thus supplied to control reservoir 50 via pipe 26, application valve 46, and pipe 49, until such time as the electrical feedback signal from transducer T6 to microprocessor 2 via wire 52 increases in proportion to the brake pipe pressure reduction in effect. It will be appreciated that microprocessor 2 establishes this control of the application and release valves 46, 48 of locomotive automatic brake control circuit 6, such that the pressure of control reservoir 50 varies inversely with the brake pipe pressure reduction in a ratio of approximately 2.5:1.

The resultant pressure developed in control reservoir 50 is connected to the control port of relay valve 62 via pipe 58, double check valve 60 and pipe 61. Relay valve 62, in turn, operates to supply air from main reservoir 27 to brake cylinder 65 via pipe 26 and delivery pipe 64. In this manner, the controlling and non-controlling locomotive brake pressure under control of brake control circuit 6 is consistent with the car brake pressure under control of the controlling locomotive brake pipe control circuit 4.

APPLICATION OF LOCOMOTIVE PNEUMATIC BACKUP BRAKE

Pneumatic control valve device 110 provides a backup pneumatic automatic locomotive brake, operating in parallel with automatic brake control circuit 6, in response to variations in brake pipe pressure. A reduction of brake pipe pressure, as explained relative to applying the car brakes throughout the train, is reflected at port 117 of control valve 110. In a manner well known to those skilled in the railway braking art, control valve device 110 is operative in response to such reduction of brake pipe pressure to connect pressure in auxiliary reservoir 113 to displacement reservoir 133 and double check valve 60 via pipe 115, supply port 111, delivery port 125, and pipe 129. Due to the inherent delay in operation of control valve device 110, the pressure in pipe 58 under control of automatic brake control circuit 6 reaches double check valve 60 before the pressure in pipe 129, thus holding the pneumatic backup control valve pressure in abeyance pending failure of the automatic brake control circuit 6, due to a microprocessor malfunction, for example, or when the locomotive is hauled "dead" in the locomotive consist, as will be hereinafter explained.

MICROPROCESSOR MALFUNCTION ON CONTROLLING LOCOMOTIVE

In the event of a malfunction that would render the controlling locomotive microprocessor 2 incapable of providing power to operate the respective electropneumatic valves heretofore discussed, the controlling locomotive will initiate a brake application automatically in response to the electropneumatic valves 22,24 in the controlling locomotive brake pipe control circuit 4 assuming a de-energized condition, as shown. Therefore, irrespective of the position of brake controller handle 12, such loss of power causes control reservoir 28 to be exhausted via release valve 24. Relay valve 34, in turn, is operated to exhaust brake pipe pressure via charging cut-off valve 68, such reduction of brake pipe pressure accordingly initiating a brake application on the cars of the train in the usual, well-known manner.

It will now be appreciated that, in accordance with the present invention, the controlling locomotive charging cut-off valve 68 will remain in its open position, irrespective of the aforementioned loss of power at the controlling locomotive microprocessor 2. Such loss of power at microprocessor 2 effects de-energization of "lead" electropneumatic valve 80, thereby venting pipe 83 at one inlet of double check valve 84. Pressure in brake pipe 40, which is present at the other inlet of double check valve 84 via branch pipe 41a, charging cut-off valve port 89, interlock chamber 88, port 87, and pipe 86, is thus connected through the double check valve to pipe 85, charging cut-off valve port 78, and chamber 77. In thus maintaining pressurization of this chamber 77, charging cut-off valve piston 69 continues to be forced leftward against bias spring 74 to effect disengagement of valve 71 from seat 75 and thereby establish the aforementioned open position of cut-off valve 68 until such time as brake pipe pressure is reduced to approximately 10–15 psi. It will be understood that charging cut-off valve chamber 73 remains depressurized in accordance with the de-energized condition of the "trail" electropneumatic valve 79 to accommodate such leftward movement of piston 69. Charging Cut-off valve 68 is, accordingly, held in its open position to accommodate the reduction of brake pipe pressure via relay valve 34.

This reduction of brake pipe pressure at the lead locomotive concurrently effects operation of pneumatic backup control valve 110, as previously explained, at the lead locomotive to effect a brake application via relay valve 62. Whereas this backup pneumatic brake control is withheld under normal power conditions, by reason of the locomotive brake cylinder control circuit 6 having precedence, as explained, de-energization of electropneumatic valves 46,48, due to the power loss at microprocessor 2, causes control reservoir 50 to be vented so that no pressure is supplied to double check valve 60 via pipe 58. Consequently, control of the locomotive automatic brake is established via pipe 129 leading to the other side of double check valve 60 at the controlling locomotive to apply the locomotive brakes.

At the same time, the effective reduction of brake pipe pressure causes the train brakes to apply, at each car and/or locomotive not so electronically equipped, in the usual, well-known manner to bring the train to a safe halt.

It will be understood from the foregoing that, without double check valve 84 and the feedback connection of brake pipe pressure to cut-off valve chamber 77, this chamber 77 would be vented in the de-energized condition of "lead" electropneumatic valve 80, allowing spring 74 to seat valve 71 and accordingly interrupt the exhaust of brake pipe pressure via pipe 41, thereby isolating brake pipe 40 from relay valve 34, whereby the desired reduction of brake pipe pressure in accordance with such loss of power would not be possible and no brake application could be achieved.

It will be further understood that bias spring 74 is necessary to assure closure of cut-off valve 68 under certain situations in which the charging cut-off valve could be open, while relay valve 34 is concurrently open to atmosphere. Such a situation would allow brake pipe pressure to escape to atmosphere. For example, following a brake pipe initiated brake application in response to a microprocessor power loss on a controlling locomotive, as above explained, the brake pipe pressure will be depleted, and must therefore be recharged to release the train brakes in order to proceed. If the status of the controlling locomotive experiencing the microprocessor power loss is changed to "trail", so that it can be hauled "dead" under control of another locomotive which has been upgraded to controlling status, any attempt to recharge brake pipe 40 to effect a release of the train brakes could be nullified by the exhaust of brake pipe pressure via the open charging cut-off valve 68 and relay valve 34 on the "dead" locomotive, without the provision of bias spring 74 to assure closure of cut-off valve 68.

MICROPROCESSOR MALFUNCTION ON TRAIL LOCOMOTIVE

No brake application will occur in the event a trailing locomotive microprocessor should experience a malfunction, due to which the respective electropneumatic valves 22,24 in brake pipe control circuit 4 and electropneumatic valves 46,48 in the locomotive brake cylinder control circuit 6 are without power. In response to such power loss, pressure is exhausted from charging cut-off valve chamber 73 via the vented electropneumatic valve 79. Also, electropneumatic valve 80 vents pipe 83, but pressure in chamber 77 is maintained by brake pipe pressure supplied thereto via double check valve 84. While this creates a pressure differential across piston 69, the concurrent exhaust of pressure at port 76 of the charging cut-off valve 68 via relay valve 34, in response to electropneumatic valve 24 venting control reservoir 28, creates a pressure differential across valve element 71 abetted by spring 74 in the direction of valve closure. Consequently, the opposing force on piston 69 due to the pressure effective in chamber 77 is sufficiently counteracted that the force exerted by spring 74 maintains closure of valve element 71. Since charging cut-off valve 68 is closed on a non-controlling locomotive, the pressure reduction provided by relay valve 34 is isolated from brake pipe 40, thereby rendering a non-controlling locomotive unresponsive to fail-safe operation of electropneumatic valves 22,24 in brake pipe control circuit 4. Also, since electropneumatic valves 46,48 are arranged to vent reservoir 50, it will be appreciated that no brake will be obtained through the non-controlling locomotive brake cylinder control circuit 6, due to this trail locomotive microprocessor power failure. Accordingly, the danger of an unrecognized brake application existing on a trailing locomotive is eliminated. However, backup control valve 110 remains available to furnish an automatic brake application on the non-controlling locomotive unit when so commanded by brake pipe reduction initiated from the lead or controlling locomotive in the consist.

We claim:

1. A brake pipe charging cut-off arrangement for a microprocessor-based locomotive brake control system comprising:
   (a) a source of fluid under pressure;
   (b) a brake pipe;
   (c) regulator means between said source of fluid pressure and said brake pipe for controlling the pressure of fluid carried in said brake pipe in accordance with a certain chosen pressure;
   (d) charging cut-off valve means having an open position for providing fluid pressure communication between said regulator means and said brake pipe, and a closed position for interrupting fluid pressure communication therebetween;
   (e) selector means for establishing said open and closed positions of said charging cut-off valve means, in accordance with a desired controlling or non-controlling mode of operation of said locomotive;
   (f) microprocessor means for providing electric power to said regulator means and said selector means, said selector means comprising:
      (i) a lead and a trail electropneumatic valve device each having a supply port to which said fluid pressure source is connected and a delivery port communicated with said supply port in an energized condition thereof and to atmosphere in a de-energized condition thereof; and
      (ii) switch means for connecting electric power from said microprocessor means to either one of said lead and trail electropneumatic valve means, while concurrently cutting off electric power from said microprocessor means to the other of said lead and trail electropneumatic valve means to establish said controlling and non-controlling modes of locomotive operation, said lead electropneumatic valve device being energized in said controlling mode of operation and said trail electropneumatic valve device being energized in said non-controlling mode;
   (g) bias means for urging said charging cut-off valve means toward said closed position, so that in the absence of electric power at said regulator means and both said lead and trail electropneumatic valve devices, fluid pressure communication between said brake pipe and said regulator means is interrupted; and
   (h) sensing means for maintaining said charging cut-off valve means in said open position in opposition to said bias means in accordance with loss of electric power from said microprocessor when said locomotive is in a controlling mode of operation.

2. A brake pipe charging cut-off arrangement as recited in claim 1, wherein said charging cut-off valve means comprises:
   (a) an interlock chamber;
   (b) a first port of said interlock chamber to which said regulator means is connected;
   (c) a second port of said interlock chamber to which said brake pipe is connected;
   (d) an annular valve seat between said first and second ports;
   (e) a valve element cooperatively arranged in said interlock chamber relative to said annular valve seat such that one side of said valve element is engaged with said valve seat in said closed position and disengaged therefrom in said open position;
   (f) a piston member operatively disposed in a first chamber formed on one side thereof and in a second chamber formed on the side thereof opposite said one side;
   (g) a stem connected to said one side of said piston member and to the side of said valve element opposite said one side, such that the area of said piston member subject to fluid pressure in said first chamber is less than the area of said piston member subject to fluid pressure in said second chamber by the area of said stem;
   (h) a third port via which said delivery port of said lead electropneumatic valve device is connected to said first chamber; and,
   (i) a fourth port via which said delivery port of said trail electropneumatic valve device is connected to said second chamber.

3. A brake pipe charging cut-off arrangement as recited in claim 2, wherein said sensing means comprises a double check valve device having an outlet connected to said third port, a first inlet subject to fluid pressure at said delivery port of said lead electropneumatic valve device, and a second inlet subject to brake pipe fluid pressure, said double check valve device connecting the predominant pressure at said first and second inlets to said outlet.

4. A brake pipe charging cut-off arrangement as recited in claim 3, wherein said second inlet of said double check valve device is connected to said interlock chamber.

5. A brake pipe charging cut-off arrangement as recited in claim 3, wherein the pressure of fluid at said source is greater than said brake pipe fluid pressure.

6. A brake pipe charging cut-off arrangement as recited in claim 1, wherein said bias means is a spring.

7. A brake pipe charging cut-off arrangement as recited in claim 4, wherein said sensing means further comprises:
   (a) said regulator means having means for exhausting fluid under pressure at said first port of said charging cut-off valve means in response to said loss of electric power from said microprocessor means; and
   (b) said valve element within the periphery of said valve seat having a pressure area greater than the pressure area of said stem such that when said valve element is engaged with said seat, said exhaust of pressure at said first port of said charging cut-off valve means creates a force differential across said valve element in a direction to maintain said valve element engaged with said seat, due to said brake pipe pressure effective in said interlock chamber.

* * * * *